June 3, 1924.

J. BRANDSTETTER

AMALGAM MIXER

Filed Feb. 23, 1922

1,496,204

Inventor
Josef Brandstetter
by Albert Scheibl
Attorney

Patented June 3, 1924.

1,496,204

UNITED STATES PATENT OFFICE.

JOSEF BRANDSTETTER, OF CHICAGO, ILLINOIS.

AMALGAM MIXER.

Application filed February 23, 1922. Serial No. 538,477.

*To all whom it may concern:*

Be it known that I, JOSEF BRANDSTETTER, citizen of the United States, residing at Chicago, in the county of Cook and State of Illinois, have invented certain new and useful Improvements in an Amalgam Mixer; and I do hereby declare the following to be a full, clear, and exact description of the invention, such as will enable others skilled in the art to which it appertains to make and use the same.

My invention relates to means for preparing dental amalgams, its general objects being those of providing a simple, inexpensive and easily manipulated appliance for rapidly and thoroughly mixing the constituents of the amalgam.

In preparing dental amalgams, the usual practice of mixing the mercury and the silver or other alloy metal by manipulating the assembled ingredients with a spatula or the like and by afterwards kneading the resulting alloy in the hand of the operator has numerous serious objections. It consumes time by requiring a hand operation, exposes the alloy materials unduly to air to permit a possible oxidizing or tarnishing of the same, exposes the materials during the manipulation to any prevailing dust in the air, and finally brings the material into contact with any moisture or dust which may accidentally have gathered on the hands of the operator.

My invention aims to overcome all of these objections by providing a mechanically driven mixer which will speedily perform the necessary intermingling of the constituents of the alloy and which will permit the preparation of the alloy to be effected without having the hand of the operator touch the same, and with a minimum of exposure to the air. Furthermore, my invention aims to provide an exceedingly simple appliance for this purpose and one which can readily be operated from any rotating shaft, such as the shaft of the motor commonly employed by dentists for grinding or polishing purposes. More particularly, my invention aims to provide an amalgam mixer in which the mixing is effected by oscillating a cup containing the ingredients, aims to employ a simple eccentric for effecting the needed oscillation, and aims to provide simple means for maintaining the cup-carrying member in operative relation to the eccentric. Still further and more detailed objects will appear from the following specification and from the accompanying drawings in which—

Figure 1:
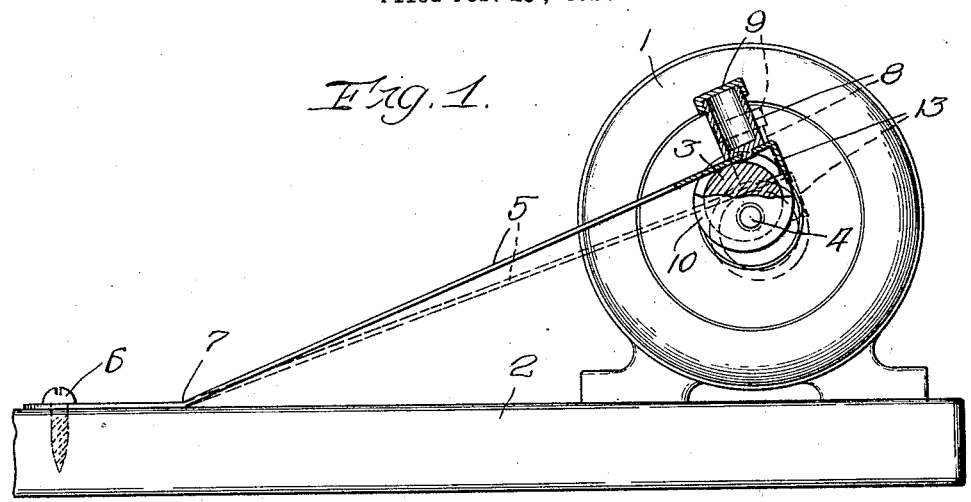
Fig. 1 is an elevation of an embodiment of my invention in which the cup-carrying strip is fastened at one end to the table supporting the motor, a portion of one flange on the eccentric being broken away to show the bearing of the strip against the eccentric.

In the embodiment of the drawings, Fig. 1 shows an electric motor 1 mounted on a table 2 and having an eccentric 3 tightly wedged upon the projecting end of the motor shaft 4. The periphery of this eccentric bears against the flat surface of a resilient strip 5 near one end of the latter, and this strip has its other end held stationary by means of a screw 6 which clamps that end of the strip to the table at a considerable distance from the eccentric. The strip 5 is desirably made of steel and has a bend 7 formed at such an angle that the resiliency of the strip will continually cause the latter to bear against the periphery of the eccentric while the latter is rotating, thereby causing the strip to oscillate between the position shown in full lines in Fig. 1 and that shown in dotted lines in the same figure.

Secured to the strip 5 near the free end of the latter, and desirably beyond the engagement of the strip with the eccentric, is a container 8, which is here shown as having a downward projection riveted through a corresponding perforation in the metal strip. This container is normally closed by a cap 9 having a knurled periphery to facilitate the screwing or unscrewing of the same. To prevent the strip from slipping off the eccentric, the latter is preferably provided at each edge with a flange 10.

Thus arranged, the container 8 forms a convenient receptacle for receiving the ingredients of the proposed amalgam, and the oscillation of the strip by the eccentric affords a simple means for violently reciprocating these ingredients within the container. That is to say, the operator merely places the ingredients in the opened cup, replaces the cap 9 and starts his motor. Owing to the considerable differences in specific gravity between the mercury and the other constituents of the proposed amalgam, the violent reciprocation will tend to move these different constituents with different velocities so that they tend to slide by one another to some extent in each direction of oscillation of the container. This tendency cooperates with the alternating impact of the mixture of ingredients against the bottom of the cup and the cover in affording an intimate intermingling of these ingredients, so that the mercury becomes thoroughly amalgamated with the other constituents. Consequently, I have found that my simple contrivance enables the operator to dispense with the usual hand operations of mixing the ingredients with a spatula or pestle, thereby saving both time and labor. Moreover, since the intimate intermingling of the ingredients into the desired amalgam is attained within a tightly closed container, I avoid the oxidation which always attends the preparation of such amalgams while exposed to the air. So also, I avoid the exposing of the material to contact with moisture or possible particles of dirt on the hand of the operator as encountered when the proposed amalgam is kneaded or otherwise worked between the hands of the operator.

Figure 2:
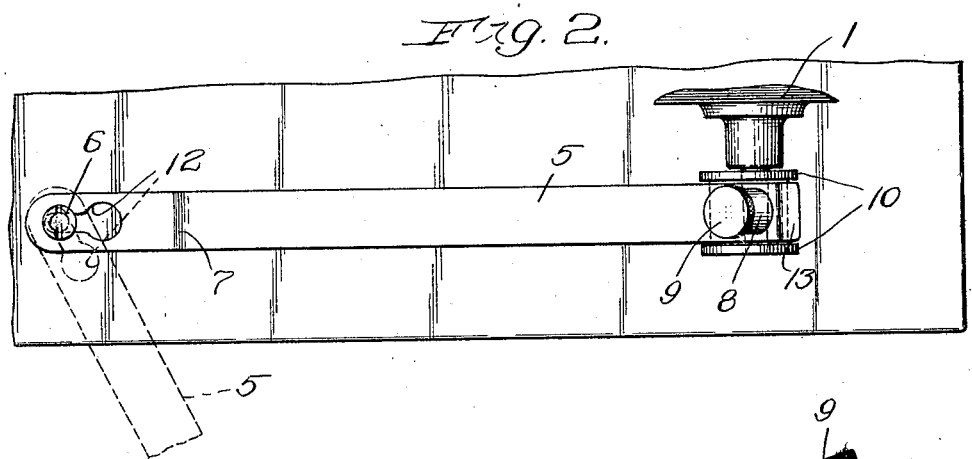
Fig. 2 is a plan view of the same embodiment.

To avoid the expense of providing a special motor for the above purpose, I desirably employ an eccentric having a tapering bore to fit the usual tapering spindle of the motor as commonly employed for dentists in connection with their polishing wheels. I also desirably mount the oscillating strip so that it can easily be detached when a polishing wheel or other instrumentality is to be used on the same motor shaft. For this purpose, I am here showing the strip 5 as equipped at its fastening end with an elongated slot through which the shank of the screw 6 extends, this slot having an enlargement 12 which can be slipped over the head of the screw if the strip is first slid longitudinally away from the motor shaft. To prevent it from accidentally sliding in that direction in case the screw 6 is not fully tightened, I desirably bend the other end of the strip to afford a guard finger 13 directed downwardly beyond the periphery of the eccentric after the manner shown in the drawings. Thus arranged, the resilient strip can readily be swung out of engagement with the eccentric by slightly loosening the screw 6, lifting the free end of the strip so as to clear the outer flange 10 on the eccentric and then rotating the strip about the screw 6 as a pivot, as shown in dotted lines in Fig. 2. Or, the strip can be entirely detached by sliding it sufficiently to bring the enlarged slot end 12 into alinement with the head of the screw 6.

Figure 3:
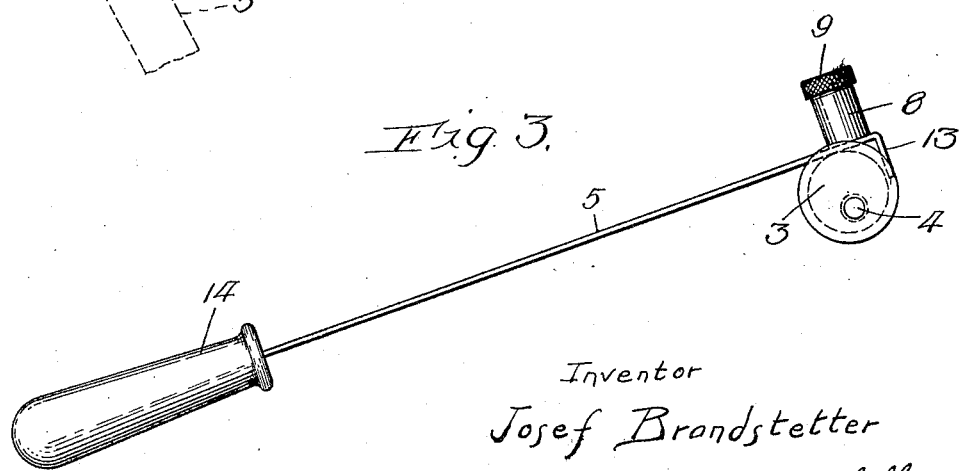
Fig. 3 is a view similar to Fig. 1 but showing an embodiment in which the cup-carrying strip is supported by a handle adapted to be held in one hand of the operator.

However, while I have heretofore illustrated and described my invention in a highly desirable embodiment in which the thorough incorporating of the ingredients into an amalgam can readily be accomplished by available mechanical means while leaving the dentist free for other work during this operation, I do not wish to be limited to the particular details of the construction and arrangement thus disclosed. Obviously, these details might be varied in many ways without departing either from the spirit of my invention or from the appended claim. For example, Fig. 3 shows an embodiment in which the bend 7 of the strip is omitted and in which one end of the latter is maintained substantially stationary by having the operator grasp a handle 14 secured to that strip. In either case, it will be evident that the vibration of the strip by the eccentric will be the same and that this will afford the desired violent and rapid reciprocation of the ingredients of the proposed amalgam. Neither do I wish to be limited to any particular constituents of the alloy or other mass which is to have its ingredients thoroughly intermingled by the appliance of my invention.

I claim as my invention:—

An amalgam mixer comprising a resilient strip, means for holding one end of the strip substantially stationary, an eccentric arranged for engaging the strip near the other end thereof, and a relatively tall container fastened at its bottom to the strip near the last end thereof for holding the ingredients of the proposed mixture, the container having its axis substantially at right angles to the adjacent portion of the strip and extending close to the axis of the eccentric, the eccentric being provided with flanges laterally guiding the resilient strip at opposite edges of the latter to maintain the strip in operative relation to the eccentric.

Signed at Chicago, Illinois, February 17th, 1922.

JOSEF BRANDSTETTER.